United States Patent
Oda et al.

(10) Patent No.: US 12,115,987 B2
(45) Date of Patent: Oct. 15, 2024

(54) TRAVEL CONTROL DEVICE, VEHICLE, TRAVEL CONTROL METHOD, AND PROGRAM

(71) Applicant: MITSUBISHI HEAVY INDUSTRIES, LTD., Tokyo (JP)

(72) Inventors: Kazumichi Oda, Tokyo (JP); Tomohiro Ikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 149 days.

(21) Appl. No.: 17/936,156

(22) Filed: Sep. 28, 2022

(65) Prior Publication Data

US 2023/0104727 A1    Apr. 6, 2023

(30) Foreign Application Priority Data

Oct. 1, 2021 (JP) .................... 2021-162908

(51) Int. Cl.
*B60W 30/14* (2006.01)
*B60W 10/20* (2006.01)
(Continued)

(52) U.S. Cl.
CPC .......... *B60W 30/146* (2013.01); *B60W 10/20* (2013.01); *B60W 30/04* (2013.01);
(Continued)

(58) Field of Classification Search
CPC .... B60W 30/146; B60W 10/20; B60W 30/04; B60W 40/103; B60W 40/105;
(Continued)

(56) References Cited

U.S. PATENT DOCUMENTS

| 10,407,035 B1* | 9/2019 | Gadda | B60W 40/114 |
| 2007/0260362 A1* | 11/2007 | Piyabongkarn | G05D 1/0891 |
| | | | 701/1 |
| 2008/0086251 A1* | 4/2008 | Lu | B60T 8/1755 |
| | | | 701/70 |

(Continued)

FOREIGN PATENT DOCUMENTS

| JP | 5453992 B2 | 3/2014 |
| JP | 6784633 B2 | 11/2020 |
| WO | WO-2021063506 A1 * | 4/2021 |

OTHER PUBLICATIONS

Zhao et al., H∞ control of integrated rollover prevention system based on improved lateral load transfer rate, Sage Journals, Transactions of the Institute of Measurement and Control, vol. 41, Issue 3, Feb. 2019, pp. 859-874 (Year: 2019).*

*Primary Examiner* — Sze-Hon Kong
(74) *Attorney, Agent, or Firm* — Osha Bergman Watanabe & Burton LLP

(57) ABSTRACT

A travel control device includes: a risk level calculation unit configured to acquire a speed in a traveling direction of a vehicle, a speed of the vehicle in a horizontal direction perpendicular to the traveling direction, and an azimuth angular velocity of the vehicle and calculate a rollover risk level based on a lateral load transfer ratio (LTR) of the vehicle; a deceleration calculation unit configured to calculate deceleration indicating an extent to which to lower the speed in the traveling direction when an absolute value of the rollover risk level exceeds a threshold value; and a control unit configured to control a driving system of the vehicle using a value obtained by lowering a target speed of the vehicle on the basis of the deceleration as a new target speed.

5 Claims, 5 Drawing Sheets

(51) Int. Cl.
  *B60W 30/04* (2006.01)
  *B60W 40/103* (2012.01)
  *B60W 40/105* (2012.01)
  *B60W 40/112* (2012.01)
(52) U.S. Cl.
  CPC ........ *B60W 40/103* (2013.01); *B60W 40/105* (2013.01); *B60W 40/112* (2013.01); *B60W 2300/121* (2013.01); *B60W 2520/06* (2013.01); *B60W 2520/20* (2013.01); *B60W 2540/18* (2013.01); *B60W 2710/207* (2013.01)
(58) Field of Classification Search
  CPC ......... B60W 40/112; B60W 2300/121; B60W 2520/06; B60W 2520/20; B60W 2540/18; B60W 2710/207
  See application file for complete search history.

(56) References Cited

U.S. PATENT DOCUMENTS

| | | | |
|---|---|---|---|
| 2008/0272899 A1* | 11/2008 | Penzotti | B60T 8/17554 701/1 |
| 2009/0099735 A1* | 4/2009 | McCoy | B60R 21/0134 701/46 |
| 2010/0185354 A1* | 7/2010 | Pruett | B60W 30/04 701/31.4 |
| 2010/0191423 A1* | 7/2010 | Koyama | B60W 30/09 701/42 |
| 2012/0065859 A1* | 3/2012 | Koto | B60T 8/4872 701/70 |
| 2012/0283923 A1* | 11/2012 | Yamada | B60T 8/17554 701/70 |
| 2012/0313769 A1* | 12/2012 | Holbert | B60W 40/112 340/440 |
| 2013/0151075 A1* | 6/2013 | Moshchuk | B60G 17/016 701/1 |
| 2013/0184936 A1* | 7/2013 | Lu | B60W 10/184 701/41 |
| 2015/0066243 A1* | 3/2015 | Hirao | B60W 40/13 701/1 |
| 2018/0236989 A1* | 8/2018 | Lian | B60T 8/172 |
| 2021/0347353 A1* | 11/2021 | Park | G08G 1/165 |
| 2022/0371623 A1* | 11/2022 | Hoshino | B60W 30/02 |
| 2023/0398979 A1* | 12/2023 | Laine | B60W 30/04 |

* cited by examiner

T SECONDS LATER

AZIMUTH ANGULAR
VELOCITY r=θ/T

TRAVEL CONTROL DEVICE, VEHICLE, TRAVEL CONTROL METHOD, AND PROGRAM

BACKGROUND OF THE INVENTION

Field of the Invention

The present disclosure relates to a travel control device, a vehicle, a travel control method, and a program.

Priority is claimed on Japanese Patent Application No. 2021-162908, filed Oct. 1, 2021, the content of which is incorporated herein by reference.

Description of Related Art

A travel control method for moving a vehicle along a target route while considering effects of disturbances is provided. For example, in travel control disclosed in Patent Document 1, a sensor for detecting a wind direction or wind speed is attached to the vehicle, and the wind direction and wind speed at a point along the vehicle travel route are calculated. A basic steering angle amount that is a steering angle amount required to cause the vehicle to travel along the target route is calculated, and a corrected steering angle amount for canceling out disturbance applied to the vehicle due to the influence of wind is calculated. Further, a target steering angle amount is calculated in consideration of the influence of wind by adding the basic steering angle amount to the corrected steering angle amount.

PATENT DOCUMENTS

[Patent Document 1] Japanese Patent No. 6784633

SUMMARY OF THE INVENTION

However, even when the corrected steering angle amount for disturbance is taken into account, a steep steering angle operation is likely to be performed with respect to a traveling speed when an amount of disturbance is excessive, and in such a case, there is risk of the vehicle rolling over.

The present disclosure provides a travel control device, a vehicle, a travel control method, and a program that can solve the above problem.

A travel control device of the present disclosure includes a risk level calculation unit configured to acquire a speed in a traveling direction of a vehicle, a speed of the vehicle in a horizontal direction perpendicular to the traveling direction, and an azimuth angular velocity of the vehicle and calculate a rollover risk level based on a lateral load transfer ratio (LTR) of the vehicle; a deceleration calculation unit configured to calculate deceleration indicating an extent to which to lower the speed in the traveling direction when an absolute value of the rollover risk level exceeds a threshold value; and a control unit configured to control a driving system of the vehicle using a value obtained by lowering a target speed of the vehicle on the basis of the deceleration as a new target speed.

A vehicle of the present disclosure includes the above travel control device.

A travel control method of the present disclosure includes acquiring a speed in a traveling direction of a vehicle, a speed of the vehicle in a horizontal direction perpendicular to the traveling direction, and an azimuth angular velocity of the vehicle and calculating a rollover risk level based on a lateral load transfer ratio (LTR) of the vehicle; calculating deceleration indicating an extent to which to lower the speed in the traveling direction when an absolute value of the rollover risk level exceeds a threshold value; and controlling a driving system of the vehicle using a value obtained by lowering a target speed of the vehicle on the basis of the deceleration as a new target speed.

A program of the present disclosure causes a computer to execute: acquiring a speed in a traveling direction of a vehicle, a speed of the vehicle in a horizontal direction perpendicular to the traveling direction, and an azimuth angular velocity of the vehicle and calculating a rollover risk level based on a lateral load transfer ratio (LTR) of the vehicle; calculating deceleration indicating an extent to which to lower the speed in the traveling direction when an absolute value of the rollover risk level exceeds a threshold value; and calculating a value obtained by lowering a target speed of the vehicle on the basis of the deceleration as a new target speed.

According to the travel control device, vehicle, travel control method, and program described above, it is possible to reduce the risk of rollover of the vehicle.

DETAILED DESCRIPTION OF THE INVENTION

Hereinafter, a travel control device of the present disclosure will be described with reference to FIGS. 1 to 7. In the following description, components having the same or similar functions are denoted by the same reference signs. Repeated description of these components may be omitted.
(Configuration)

Figure 1:
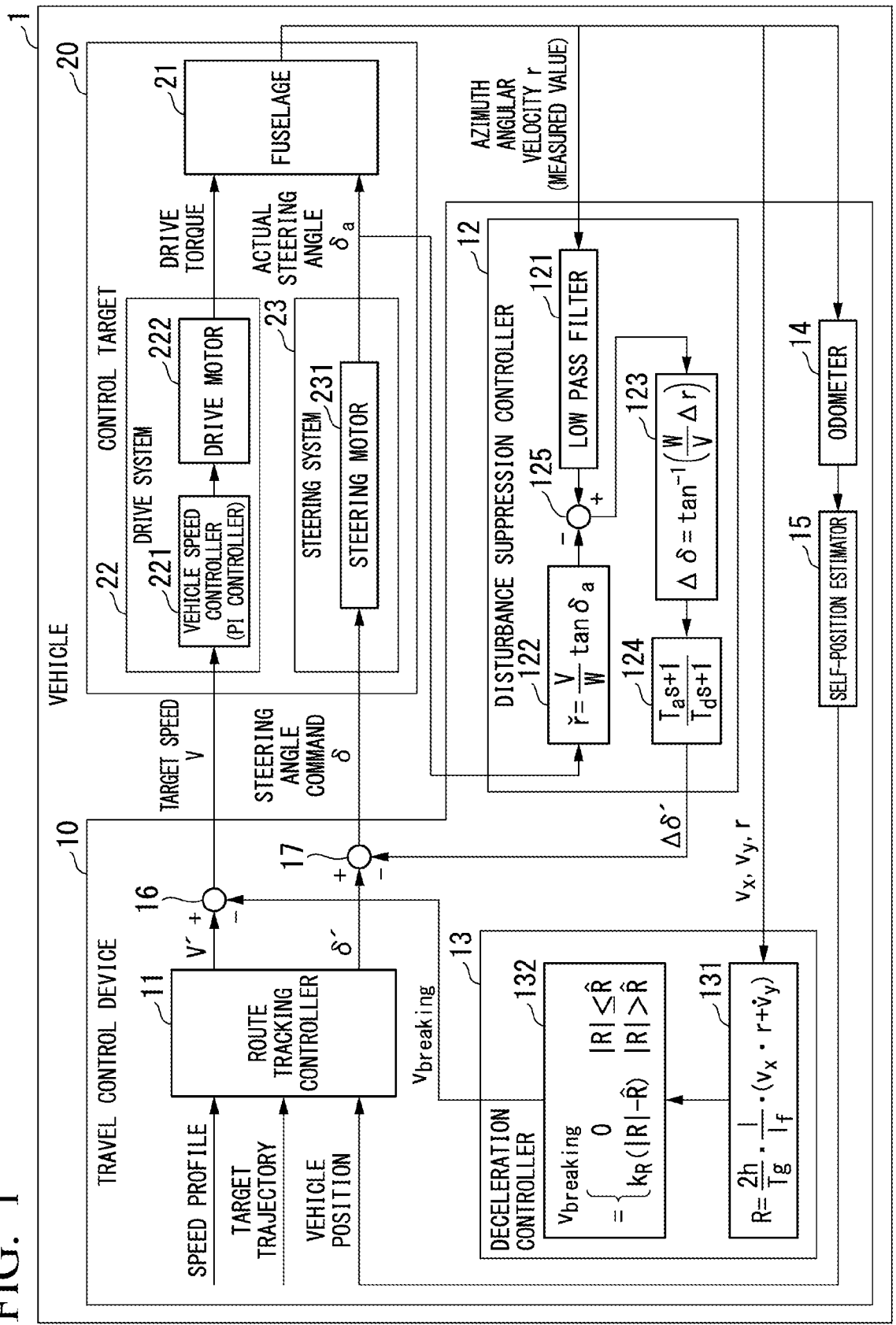
FIG. 1 is a diagram illustrating an example of a travel control device according to an embodiment.

FIG. 1 illustrates an example of a travel control device according to the embodiment. The vehicle 1 includes a travel control device 10 and a control target 20. The travel control device 10 includes a route tracking controller 11, a disturbance suppression controller 12, a deceleration controller 13, an odometer 14, and a self-position estimator 15. The control target 20 includes a fuselage 21, a drive system 22, and a steering system 23.

The fuselage 21 includes wheels of the vehicle 1, a body, and sensors included in the vehicle 1. The sensors included in the vehicle 1 include an inertial navigation device (IMU: inertial measurement unit), a tire tachometer, a steering angle sensor, and the like.

The drive system 22 includes a vehicle speed controller 221 and a drive motor 222. The vehicle speed controller 221 is, for example, a proportional integral (PI) controller. The vehicle speed controller 221 calculates a rotation speed of the wheels that brings a deviation between a target speed V output by the travel control device 10 and actual speed of the vehicle 1 close to 0, and drives the drive motor 222 at that rotation speed. The drive motor 222 rotates the wheels at the rotation speed calculated by the vehicle speed controller 221.

The steering system 23 includes a steering motor 231 that controls directions of the wheels. The steering system 23 controls the steering motor 231 according to the steering angle command δ output by the travel control device 10 to change the directions of the wheels.

The route tracking controller 11 acquires a predetermined target trajectory and speed profile, position information of the vehicle 1 estimated by the self-position estimator 15, and calculates a target speed V' and a steering angle command δ' for moving the vehicle 1 along the target trajectory. A known route tracking controller can be used for the route tracking controller 11. For example, a target speed is determined in the speed profile for each predetermined position along the target trajectory, and the route tracking controller 11 acquires the target speed in the position information of the vehicle 1 estimated by the self-position estimator 15 by referring to the speed profile, and outputs a value thereof as the target speed V'. Further, for example, the route tracking controller 11 acquires a curvature of the target route at a point at which the vehicle 1 travels after Δt seconds by referring to the target trajectory, and calculates the steering angle command δ' on the basis of the vehicle speed of the own vehicle at the same point and a predetermined motion characteristic of the vehicle, as disclosed in Patent Document 1.

The disturbance suppression controller 12 calculates a corrected steering angle Δδ' using a kinematics model and a steering system when the vehicle 1 travels without slipping as a normative model, on the basis of an azimuth angle deviation of the vehicle 1. The disturbance suppression controller 12 acquires an actual steering angle δa output from the steering system 23 to the fuselage 21. Alternatively, the disturbance suppression controller 12 calculates the actual steering angle δa from the steering angle command δ using Equation (1) below obtained by approximating an operation lag of the steering motor 231 included in the steering system 23 or the like with a first-order lag system.

$$\delta a = 1/(T_a s + 1) \times \delta \quad (1)$$

Here, $T_a$ is a time constant representing a lag of the steering motor 231 included in the steering system 23 or the like, and s is a Laplace operator. The disturbance suppression controller 12 substitutes the obtained actual steering angle δa into Equation (2) below to calculate an ideal azimuth angular velocity r^ according to the actual steering angle δa.

$$r^\wedge = V/W \times \tan(\delta a) \quad (2)$$

Figure 2:
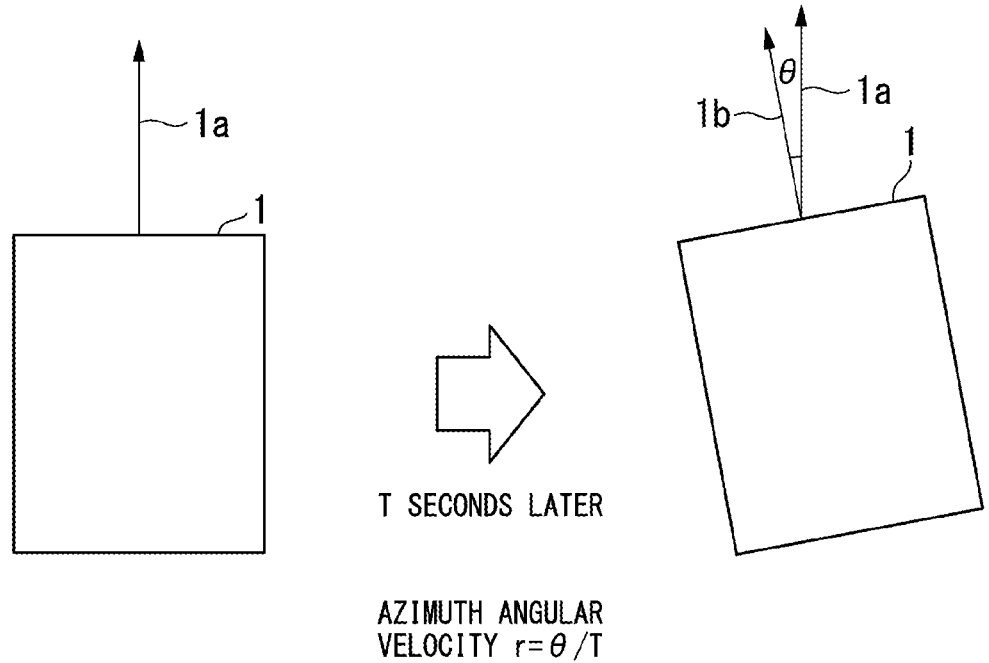
FIG. 2 is a diagram illustrating an azimuth angular velocity of a vehicle.

Here, V is the speed of the vehicle 1 (target speed V, which will be described below), and W is a wheelbase length. The wheelbase length is a distance between front wheels and rear wheels of the vehicle 1 (W in FIG. 3B). The azimuth angular velocity is a change in a traveling direction of the vehicle 1 per unit time, as illustrated in FIG. 2. For example, the vehicle 1 travels in a direction of an arrow 1a in left diagram of FIG. 2 at a certain time, travels in a direction of an arrow 1b in right diagram of FIG. 2 T seconds later, and when an angle between the arrow 1a and the arrow 1b is θ, the azimuth angular velocity of the vehicle 1 is θ/T (rad/s) during this period. Further, Equation (2) is a kinematics model 122 when the vehicle 1 travels without slipping on the basis of the azimuth angle deviation. The kinematics model 122 is a relatively simple model in which slipping of a tire, wheel spin, or the like is not considered, and indicates a relationship between a traveling speed V, the steering angle δa, and the azimuth angular speed r^ Because the kinematics model 122 of Equation (2) is publicly known, description of a derivation method is omitted.

Further, the disturbance suppression controller 12 acquires the azimuth angular velocity r of the vehicle 1 measured by the inertial navigation device included in the vehicle 1, and calculates a deviation Δr between a value r_obtained by removing a high-frequency noise component using a low-pass filter 121 and an ideal azimuth angular velocity $r^v$ calculated using Equation (2), according to Equation (3) below using the subtractor 125.

$$\Delta r = r\_ - r^v \quad (3)$$

Next, the disturbance suppression controller 12 inputs Δr to a corrected steering angle calculator 123 to calculate the corrected steering angle Δδ. The corrected steering angle calculator 123 calculates the corrected steering angle Δδ from Δr and Equation (4) obtained by modifying Equation (2) above.

$$\Delta \delta = \tan^{-1}(W \cdot \Delta r / V) \quad (4)$$

The disturbance suppression controller 12 compensates for the corrected steering angle Δδ using a lag and lead compensator 124 and outputs the corrected steering angle Δδ' after compensation. The corrected steering angle Δδ' is calculated by Equation (5) below.

$$\Delta \delta' = \{(T_a s + 1)/(T_d s + 1)\} \times \Delta \delta \quad (5)$$

$T_a$ is a time constant representing the operation lag of the steering motor 231 or the like, $T_d$ is a time constant representing a frequency band for cutting off a high-frequency component, and s is a Laplace operator. It is possible to calculate the corrected steering angle Δδ' by removing the high-frequency component and compensating for (advancing) the operation lag of the steering motor 231 or the like using Equation (5).

The travel control device 10 calculates a deviation between the steering angle δ' output by the route tracking controller 11 and the corrected steering angle Δδ' after compensation output by the disturbance suppression controller 12 using the subtractor 17 according to Equation (6) below to calculate the steering angle command δ. The travel control device 10 outputs (commands) the steering angle command δ.

$$\delta = \delta' - \Delta \delta' \quad (6)$$

It is possible to collectively compensate for slipping of the vehicle 1 or other noises as disturbance by feeding back the corrected steering angle Δδ' after correction to the steering angle command δ' output by the route tracking controller 11, and it is possible to calculate a target steering angle δ for cancelling out an influence of disturbance and tracking the target route.

The deceleration controller 13 includes a risk level calculator 131 and a deceleration calculator 132. The risk level calculator 131 calculates a rollover risk level based on a lateral load transfer ratio (LTR) from forward speed $v_x$, side-slip speed $v_y$, and azimuth speed r measured by the inertial navigation device included in the vehicle 1.

Figure 3A:
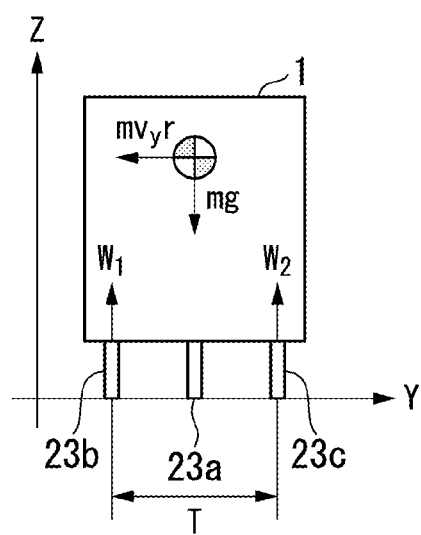
FIG. 3A is a first diagram illustrating an LTR calculation method according to the embodiment.
Figure 3B:
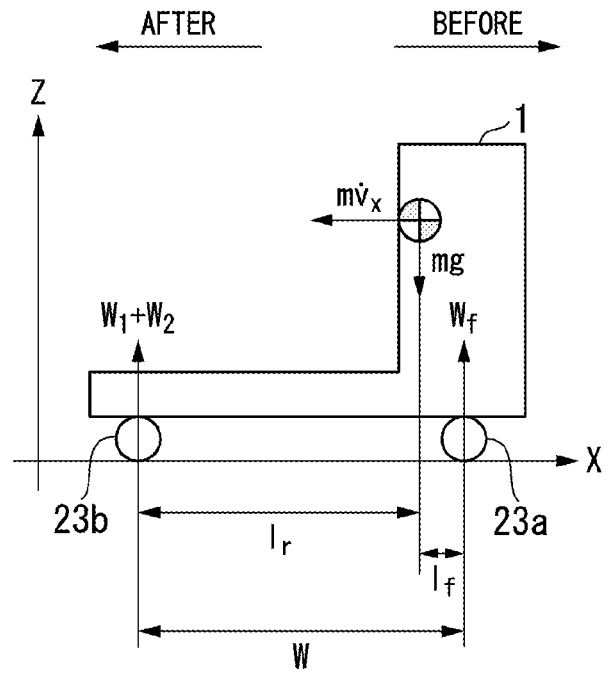
FIG. 3B is a second diagram illustrating an LTR calculation method according to the embodiment.

A method of calculating the LTR will be described with reference to FIG. 3A and FIG. 3B. FIG. 3A and FIG. 3B illustrates an example of a fuselage when the vehicle 1 is an automated guided forklift (AGF). FIG. 3A illustrates a front view of the vehicle 1, and FIG. 3B illustrates a side view of the vehicle 1. The vehicle 1 includes a front wheel 21a and rear wheels 21b and 21c. A load on the front wheel 21a is $W_f$, and loads on the rear wheels 21b and 21c are $W_1$ and $W_2$. In this case, it is possible to calculate the LTR using Equation (7) below.

$$LTR = (W_1 - W_2)/(W_1 + W_2) \tag{7}$$

The LTR is a ratio of loads applied to left and right wheels of the vehicle 1, and when the LTR exceeds ±1 (a state in which one wheel floats) (or when LTR is close to ±1), the vehicle 1 is likely to roll over.

The traveling direction of the vehicle 1 is an x-axis, a horizontal direction orthogonal to the traveling direction is a y-axis, and a vertical direction is a z-axis. A weight of the vehicle 1 is m, a speed in an x-axis direction is $v_x$, a speed in a y-axis direction (a speed in a side-slip direction) is $v_y$, gravity is g, a distance from the center of gravity of the vehicle 1 to the rear wheels 21b and 21c is $l_r$, a distance from the center of gravity of the vehicle 1 to the ground is h, a distance from the center of gravity of the vehicle 1 to the front wheels 21a is $l_f$, and a distance between the left and right rear wheels is T. With this, three equations (8) to (10) below are established.

$$(1/2)(W_1 - W_2) = hm v_y r \tag{8}$$

$$1r \cdot (W_1 + W_2) = hm v_x \cdot + l_f W_f \tag{9}$$

($v_x \cdot$ indicates acceleration of the vehicle 1 in the x direction.)

$$W_f + W_1 + W_2 = m_g \tag{10}$$

When Equations (8) to (10) are solved for $W_1$ and $W_2$ and solutions thereof are substituted into Equation (7), Equation (11) below is obtained.

$$LTR = (W_1 - W_2)/(W_1 + W_2) = (2h/Tg) \cdot (lr/lf) \cdot v_x \cdot r \tag{11}$$

Further, the risk level calculator 131 calculates the acceleration $v_y \cdot$ from the velocity $v_y$ in the y-axis direction, and calculates a rollover risk level R expressed by Equation (12) below.

[Math. 1]

$$R = \frac{2h}{Tg} \cdot \frac{l_r}{l_f} \cdot (v_x \cdot r + \dot{v}_y) \tag{12}$$

The deceleration calculator 132 calculates a deceleration $V_{breaking}$ using Equation (13) below.

[Math. 2]

$$v_{breaking} = \begin{cases} 0 & |R| \leq \hat{R} \\ k_R(|R| - \hat{R}) & |R| > \hat{R} \end{cases} \tag{13}$$

$\hat{R}$ indicates a risk level when a brake starts to work.

That is, the deceleration calculator 132 determines whether an absolute value of the rollover risk level R is greater than a predetermined threshold value $R\hat{}$, and calculates the deceleration $V_{breaking}$ using Equation (14) below when the absolute value of the rollover risk level R is greater than the predetermined threshold value $R\hat{}$.

$$V_{breaking} = k_R \cdot (|R| - R\hat{}) \tag{14}$$

Here, $k_R$ is a coefficient for converting dimensionless (|R|−R^) into velocity (m/s), and a magnitude thereof is determined in advance by an experiment or simulation. The magnitude of the threshold R^ is a value smaller than 1 (for example, 0.5). Further, when the absolute value of the rollover risk level R is equal to or smaller than the predetermined threshold value R^, the deceleration calculator 132 calculates 0 as the deceleration $V_{breaking}$.

The travel control device 10 calculates the target speed V according to Equation (15) below using the speed V' calculated by the route tracking controller 11, the deceleration $V_{breaking}$ calculated by the deceleration calculator 132, and the subtractor 16. The travel control device 10 outputs (instructs) the target speed V to the control target.

$$V = V' - V_{breaking} \tag{15}$$

When the rollover risk level R exceeds the threshold value R^, it is possible to prevent the rollover of the vehicle 1 by performing deceleration control.

The odometer 14 integrates the rotation speed of the wheels measured by the tire tachometer and a total steering angle measured by the steering angle sensor to calculate an amount of movement (a movement distance and a movement direction) of the vehicle 1.

The self-position estimator 15 adds the amount of movement of the vehicle 1 calculated by the odometer 14 to an initial position of the vehicle 1 to estimate the position information of the vehicle 1. The self-position estimator 15 outputs the estimated position information to the route tracking controller 11.

(Operation)

Next, an operation of the travel control device 10 will be described.

Figure 4:
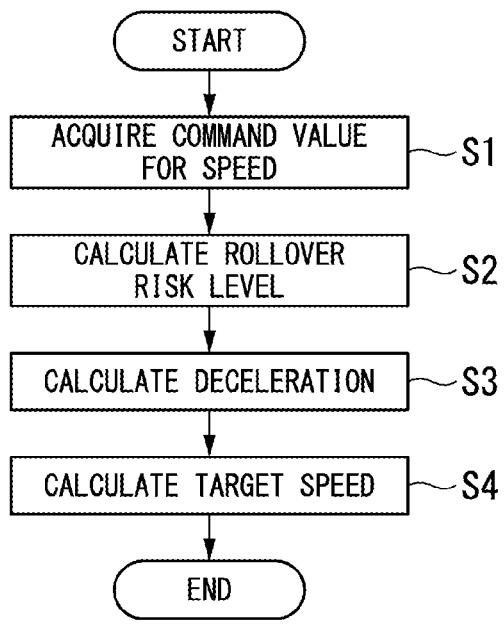
FIG. 4 is a diagram illustrating an example of vehicle speed calculation processing according to the embodiment.

FIG. 4 is a diagram illustrating an example of vehicle speed calculation processing according to the embodiment.

The travel control device 10 acquires a command value for the speed of the vehicle 1 (step S1).

For example, the travel control device 10 acquires the speed V' that is calculated by the route tracking controller 11. Next, the risk level calculator 131 calculates the rollover risk level R (step S2). The risk level calculator 131 acquires the speed $v_x$ in the traveling direction, the speed $v_y$ in the horizontal direction perpendicular to the traveling direction, and the azimuth angular speed r from sensors such as the inertial navigation device included in the vehicle 1, and calculates the rollover risk level R using Equation (12). Next, the deceleration calculator 132 calculates the deceleration $V_{breaking}$ (step S3). The deceleration calculator 132 compares the rollover risk level R with the threshold value R^, and calculates the deceleration $v_{breaking}$ using Equation (13). Next, the travel control device 10 calculates the target speed V (step S4). The travel control device 10 calculates the target speed V of the vehicle 1 by subtracting the deceleration $v_{breaking}$ from the speed command value (for example, V') using the subtractor 16. The travel control device 10 outputs the target speed V to drive system 22.

Figure 5:
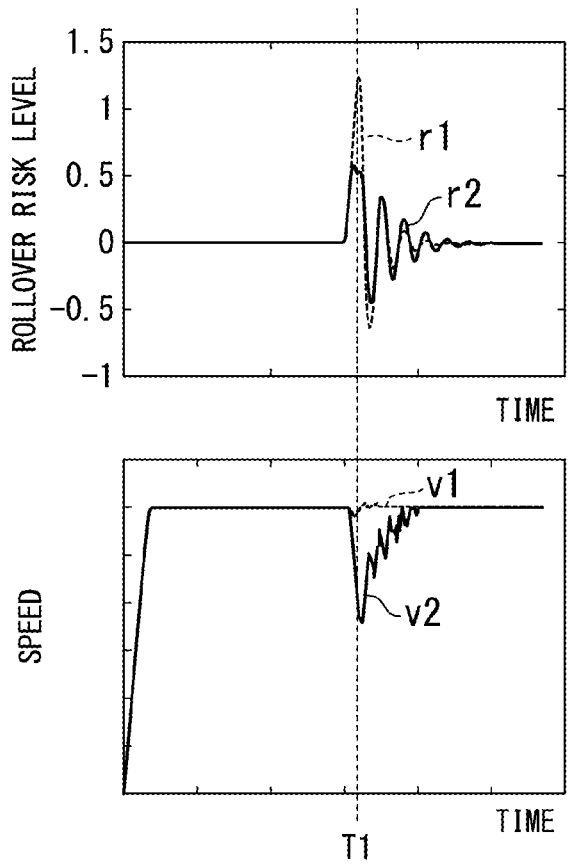
FIG. 5 is a diagram illustrating an example of effects of deceleration control according to the embodiment.

FIG. 5 illustrates an example of speed change when correction of the target speed is performed according to deceleration and when the correction is not performed. FIG. 5 is a diagram illustrating an example of an effect of deceleration control according to the embodiment. The upper diagram of FIG. 5 illustrates change over time in the rollover risk level R of the traveling vehicle 1, and the lower diagram of FIG. 5 illustrates change over time in the speed of the vehicle 1. The vehicle 1 is traveling on a route including a curve, and data illustrated in FIG. 5 is the rollover risk level R and the speed when the vehicle turns the curve around time T1. In the upper diagram of FIG. 5, a graph r1 shows the rollover risk level R when deceleration is not performed according to the deceleration $v_{breaking}$, and a graph r2 shows the rollover risk level R when the deceleration is performed according to the deceleration $v_{breaking}$. In the lower diagram of FIG. 5, a graph v1 shows speed of vehicle 1 when deceleration is not performed according to the deceleration $v_{breaking}$, and a graph v2 shows speed when deceleration is performed according to the deceleration $v_{breaking}$. As illustrated in the figure, when deceleration using the deceleration $v_{breaking}$ is not performed (the graphs r1 and v1), the vehicle 1 turns the curve without decelerating, the rollover risk level R exceeds 1, and the vehicle 1 rolls over. When the deceleration using the deceleration $v_{breaking}$ is performed (the graphs r2 and v2), the vehicle 1 can travel without rollover by turning the curve with decelerating. Thus, it is possible to reduce the rollover risk level of the vehicle 1 even when a steep steering wheel operation is performed by performing the deceleration control on the vehicle 1 according to the rollover risk level R based on the LTR.

Figure 6:
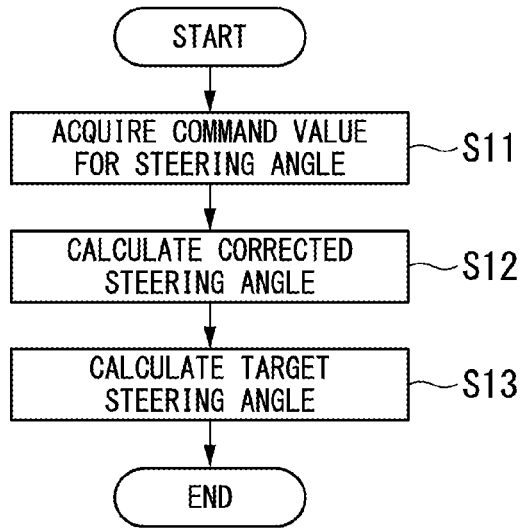
FIG. 6 is a diagram illustrating an example of steering angle calculation processing according to the embodiment.

FIG. 6 is a diagram illustrating an example of steering angle calculation processing according to the embodiment.

The travel control device 10 acquires a command value for the steering angle of the vehicle 1 (step S11). For example, the travel control device 10 acquires the steering angle command δ' calculated by the route tracking controller 11. Next, the disturbance suppression controller 12 calculates the corrected steering angle Δδ' (step S12). The disturbance suppression controller 12 uses the actual steering angle δa and the kinematics model 122 to calculate an ideal azimuth angular velocity $r^v$ (when side-slip of the vehicle 1 or the like does not occur). The disturbance suppression controller 12 calculates a deviation between the azimuth angular velocity r and the azimuth angular velocity $r^v$ of the vehicle 1 from which noise has been removed by the low-pass filter 121 using the subtractor 125, and calculates the corrected steering angle Δδ for compensating for this deviation using the corrected steering angle calculator 123. The disturbance suppression controller 12 performs compensation for leading the lag of the steering motor 231 or the like and lag compensation for blocking high-frequency components on the corrected steering angle Δδ using the lag and lead compensator 124, and outputs the corrected steering angle Δδ' after compensation to the subtractor 17. Next, the travel control device 10 calculates the target steering angle (step S13). The travel control device 10 calculates the target steering angle (the steering angle command δ) of the vehicle 1 by subtracting the corrected steering angle Δδ' from the steering angle command δ' using the subtractor 17. The travel control device 10 outputs the target steering angle to the steering system 23.

Figure 7:
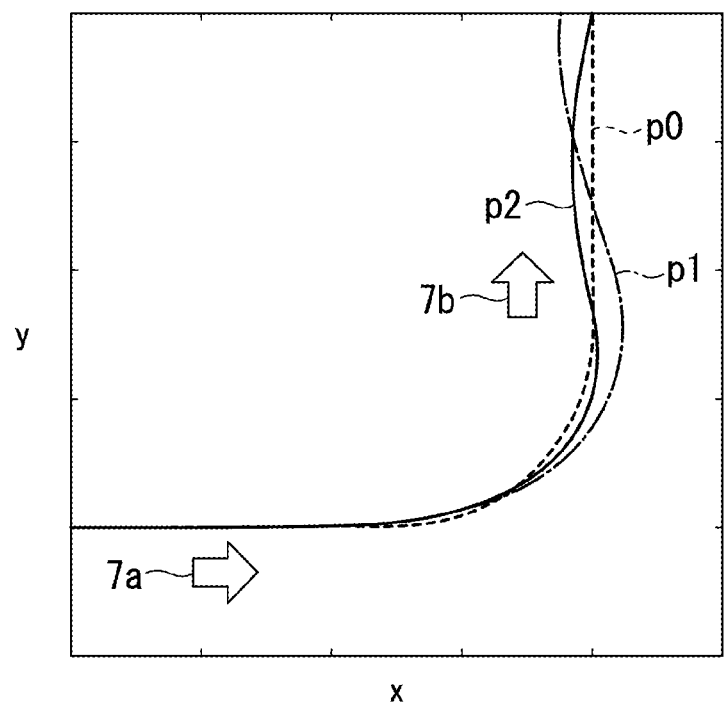
FIG. 7 is a diagram illustrating an example of effects of disturbance suppression control according to the embodiment.

FIG. 7 illustrates an example of a travel trajectory of the vehicle 1 when correction of the steering angle is performed by the disturbance suppression controller 12 and when the correction is not performed. FIG. 7 is a diagram illustrating an example of an effect of disturbance suppression control according to the embodiment. A dashed line p0 in FIG. 7 indicates the target trajectory of the vehicle 1, and the vehicle 1 travels in a positive direction of the x-axis as indicated by an arrow 7a, turns a curve, and travels in a positive direction of a y-axis as indicated by an arrow 7b. A line p1 indicates a trajectory of the vehicle 1 when the correction of the steering angle is not performed, and a line p2 indicates a trajectory of the vehicle 1 when the correction of the steering angle is performed. As illustrated in FIG. 7, it is possible to reduce a meandering amount on a straight road after turning of the curve in a case in which the correction of the steering angle is performed, as compared to a case in which the correction is not performed. That is, it is possible to improve tracking of the target route. This is the effect of the disturbance suppression controller 12, which steers the vehicle so that deviations in azimuthal angular velocity due to the effects of curves are quickly converged.

The travel control device 10 continuously performs the processing described with reference to FIGS. 4 and 6 in parallel while the vehicle 1 is traveling. Although in the above embodiment, the route tracking controller 11 calculates the desired speed V' and the total steering angle δ', the speed V corrected by the deceleration controller 13 and the steering angle δ' corrected by the disturbance suppression controller 12 may be a value determined by an input of an operator of the vehicle 1.

(Effects)

As described above, according to the present embodiment, it is possible to prevent rollover by decelerating the vehicle 1 on the basis of the rollover risk level R even when steep steering is performed. Further, it is possible to suppress a deviation of the vehicle 1 from the target route by calculating the corrected steering angle Δδ' on the basis of a deviation between an ideal azimuth angle velocity and a measured value of the azimuth angle velocity without specifying a cause of the azimuth angle deviation of the vehicle 1 and feeding back this value. Accordingly, for example, even when steep steering is performed at the time of turning a curve, the vehicle can turn without rollover and then perform travel with a deviation from the target route suppressed. Further, it is possible to suppress the deviation of the vehicle 1 from the target route and reduce the rollover risk level, by rapidly detecting change in speed or azimuth angular velocity and performing correction of the steering angle in the disturbance suppression controller 12 or the deceleration control based on the rollover risk level R, for example, even when the vehicle 1 rides on a curb while traveling in a straight line. Further, according to the present embodiment, because the disturbance suppression control or deceleration control can be performed by using sensors generally mounted on a vehicle (sensors capable of detecting $v_x$, $v_y$, and r are normally mounted on the vehicle), it is not necessary to add new sensors for the control of the present embodiment.

The above-described travel control device 10 is mounted in a computer including a processor such as a central processing unit (CPU), a main memory, an auxiliary memory, and the like, and each function described above is realized by the processor executing a program stored in the auxiliary storage device. The processor secures a storage area in the main memory according to the program. The processor secures a storage area for storing data that is being processed, in the auxiliary storage device according to the program. Hardware such as a large scale integration (LSI), an application specific integrated circuit (ASIC), and a field-programmable gate array (FPGA) may execute some or all of the processing of the travel control device 10.

In addition, it is possible to appropriately replace the components in the above-described embodiment with well-known components without departing from the spirit of the present invention. Further, the technical scope of the present invention is not limited to the above-described embodiments, and various changes can be made without departing from the spirit of the present invention.

<Supplements>

The travel control device, vehicle, travel control method, and program described in the respective embodiments are understood, for example, as follows.

(1) The travel control device 10 according to a first aspect includes a risk level calculation unit (the risk level calculator 131) configured to acquire speed ($v_x$) in a traveling direction of a vehicle, a speed ($v_y$) of the vehicle in a horizontal direction perpendicular to the traveling direction, and an azimuth angular velocity (r) of the vehicle and calculate a rollover risk level based on a lateral load transfer ratio (LTR) of the vehicle; a deceleration calculation unit (the deceleration calculator 132) configured to calculate deceleration ($v_{breaking}$) indicating an extent to which the speed in the traveling direction is lowered when an absolute value of the rollover risk level exceeds a threshold value; and a control unit configured to control a driving system of the vehicle using a value obtained by lowering a target speed (V') of the vehicle on the basis of the deceleration as a new target speed (V).

Accordingly, it is possible to prevent the vehicle from rolling over. For example, because a steep vehicle operation is likely to be performed with respect to the traveling speed when disturbance (riding on a curve or curb) is excessive, a forklift with a high center of gravity has a risk of rollover, but according to the present embodiment, it is possible to reduce the risk of rollover.

(2) The travel control device 10 according to a second aspect is the travel control device 10 of (1), wherein the risk level calculation unit calculates the rollover risk level by multiplying a value obtained by adding acceleration in the horizontal direction to a value obtained by multiplying the speed in the traveling direction by the azimuth angular speed, by a predetermined coefficient (Equation (12)).

Accordingly, it is possible to calculate the rollover risk level R based on the LTR of the vehicle, on the basis of the speed ($v_x$) of the vehicle in the traveling direction, the speed ($v_y$) of the vehicle in the horizontal direction, and the azimuth angular velocity (r).

(3) The travel control device 10 according to a third aspect is the travel control device 10 of (1) to (2), wherein the deceleration calculation unit (the deceleration calculator 132) calculates the deceleration by multiplying a difference between the absolute value of the rollover risk level and the threshold value by a predetermined coefficient (Equation (13)).

Thus, it is possible to calculate the deceleration $v_{breaking}$ for preventing the vehicle from rolling over.

(4) The travel control device 10 according to a fourth aspect is the travel control device 10 of (1) to (3), further including: a corrected steering angle calculation unit configured to calculate a corrected steering angle ($\Delta\delta'$) on the basis of a deviation between an ideal value ($r^v$) of the azimuth angular velocity calculated on the basis of a kinematics model representing a relationship between the speed in the traveling direction of the vehicle, the steering angle, and the azimuth angular velocity of the vehicle, and an actual steering angle of the vehicle, and a measured value (r) of the azimuth angular velocity, wherein the control unit controls the steering system of the vehicle using a value obtained by subtracting the corrected steering angle from the target steering angle as a new target steering angle.

Accordingly, it is possible to control traveling of the vehicle on the basis of the steering angle for compensating for an influence of disturbance that influences the azimuth angular velocity. Further, when slipping of the vehicle is compensated, the vehicle traveling at high speed is likely to roll over when a steep operation is performed, but with the configurations of the first to third aspects, it is possible to perform disturbance compensation while avoiding the rollover.

(5) A vehicle according to a fifth aspect includes the travel control device according to any one of (1) to (4).

This makes it possible for the vehicle to include a rollover prevention function.

(6) A travel control method according to a sixth aspect includes a step of acquiring speed in a traveling direction of a vehicle, a speed of the vehicle in a horizontal direction perpendicular to the traveling direction, and an azimuth angular velocity of the vehicle and calculating a rollover risk level based on a lateral load transfer ratio (LTR) of the vehicle; a step of calculating deceleration indicating an extent to which the speed in the traveling direction is lowered when an absolute value of the rollover risk level exceeds a threshold value; and a step of controlling a driving system of the vehicle using a value obtained by lowering a target speed of the vehicle on the basis of the deceleration as a new target speed.

(7) A program according to a seventh aspect causing a computer to execute: a step of acquiring speed in a traveling direction of a vehicle, a speed of the vehicle in a horizontal direction perpendicular to the traveling direction, and an azimuth angular velocity of the vehicle and calculating a rollover risk level based on a lateral load transfer ratio (LTR) of the vehicle; a step of calculating deceleration indicating an extent to which the speed in the traveling direction is lowered when an absolute value of the rollover risk level exceeds a threshold value; and a step of calculating a value obtained by lowering a target speed of the vehicle on the basis of the deceleration as a new target speed.

EXPLANATION OF REFERENCES

1 Vehicle
10 Travel control device
11 Route tracking controller
12 Disturbance suppression controller
13 Deceleration controller
14 Odometry
15 Self-position estimator
20 Control target
21 Fuselage
22 Drive system
221 Vehicle speed controller
222 Drive motor
23 Steering system
231 Steering motor
121 Low pass filter
122 Kinematics model
123 Corrected steering angle calculator
124 Lag and lead compensator
131 Risk level calculator
132 Deceleration calculator
21a Front wheel
21b Rear wheel
21c Rear wheel

What is claimed is:

1. A travel control device comprising:
a risk level calculation unit configured to acquire a speed in a traveling direction of a vehicle, a speed of the vehicle in a horizontal direction perpendicular to the traveling direction, and an azimuth angular velocity of the vehicle and calculate a rollover risk level based on a lateral load transfer ratio (LTR) of the vehicle;

a deceleration calculation unit configured to calculate deceleration indicating an extent to which to lower the speed in the traveling direction when an absolute value of the rollover risk level exceeds a threshold value; and a control unit configured to control a driving system of the vehicle using a value obtained by lowering a target speed of the vehicle on the basis of the deceleration as a new target speed, wherein the risk level calculation unit calculates the rollover risk level by multiplying a value obtained by adding acceleration in the horizontal direction to a value obtained by multiplying the speed in the traveling direction by the azimuth angular speed, by a predetermined coefficient.

2. A travel control device comprising:

a risk level calculation unit configured to acquire a speed in a traveling direction of a vehicle, a speed of the vehicle in a horizontal direction perpendicular to the traveling direction, and an azimuth angular velocity of the vehicle and calculate a rollover risk level based on a lateral load transfer ratio (LTR) of the vehicle;

a deceleration calculation unit configured to calculate deceleration indicating an extent to which to lower the speed in the traveling direction when an absolute value of the rollover risk level exceeds a threshold value; and a control unit configured to control a driving system of the vehicle using a value obtained by lowering a target speed of the vehicle on the basis of the deceleration as a new target speed, wherein the deceleration calculation unit calculates the deceleration by multiplying a difference between the absolute value of the rollover risk level and the threshold value by a predetermined coefficient.

3. A travel control device comprising:

a risk level calculation unit configured to acquire a speed in a traveling direction of a vehicle, a speed of the vehicle in a horizontal direction perpendicular to the traveling direction, and an azimuth angular velocity of the vehicle and calculate a rollover risk level based on a lateral load transfer ratio (LTR) of the vehicle;

a deceleration calculation unit configured to calculate deceleration indicating an extent to which to lower the speed in the traveling direction when an absolute value of the rollover risk level exceeds a threshold value;

a control unit configured to control a driving system of the vehicle using a value obtained by lowering a target speed of the vehicle on the basis of the deceleration as a new target speed; and a corrected steering angle calculation unit configured to calculate a corrected steering angle on the basis of a deviation between an ideal value of the azimuth angular velocity calculated on the basis of a kinematics model representing a relationship between the speed in the traveling direction of the vehicle, the steering angle, and the azimuth angular velocity of the vehicle, and an actual steering angle of the vehicle, and a measured value of the azimuth angular velocity, wherein the control unit controls the steering system of the vehicle using a value obtained by subtracting the corrected steering angle from the target steering angle as a new target steering angle.

4. A vehicle comprising the travel control device according to claim 1.

5. A travel control method comprising:

a step of acquiring a speed in a traveling direction of a vehicle, a speed of the vehicle in a horizontal direction perpendicular to the traveling direction, and an azimuth angular velocity of the vehicle and calculating a rollover risk level based on a lateral load transfer ratio (LTR) of the vehicle;

a step of calculating deceleration indicating an extent to which to lower the speed in the traveling direction when an absolute value of the rollover risk level exceeds a threshold value;

a step of controlling a driving system of the vehicle using a value obtained by lowering a target speed of the vehicle on the basis of the deceleration as a new target speed; and in the step of acquiring, calculating the rollover risk level by multiplying a value obtained by adding acceleration in the horizontal direction to a value obtained by multiplying the speed in the traveling direction by the azimuth angular speed, by a predetermined coefficient.

* * * * *